(12) United States Patent
Zhang et al.

(10) Patent No.: US 9,546,596 B1
(45) Date of Patent: Jan. 17, 2017

(54) SILENCER PANEL AND SYSTEM FOR HAVING PLASTIC PERFORATED SIDE WALL AND ELECTROSTATIC PARTICLE REMOVAL

(71) Applicant: General Electric Company, Schenectady, NY (US)

(72) Inventors: Hua Zhang, Greer, SC (US); Dale Joel Davis, Greenville, SC (US); Valery Ivanovich Ponyavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/855,918

(22) Filed: Sep. 16, 2015

(51) Int. Cl.
*G10K 11/16* (2006.01)
*F02C 7/045* (2006.01)
*F01N 1/24* (2006.01)

(52) U.S. Cl.
CPC .............. *F02C 7/045* (2013.01); *F01N 1/24* (2013.01); *G10K 11/161* (2013.01)

(58) Field of Classification Search
CPC .......... F02C 7/045; F01N 1/24; G10K 11/161
USPC ........................................................ 181/214
See application file for complete search history.

(56) References Cited

U.S. PATENT DOCUMENTS

| | | | | |
|---|---|---|---|---|
| 4,277,260 A | * | 7/1981 | Browning | B01D 46/0068 118/326 |
| 5,394,786 A | | 3/1995 | Gettle et al. | |
| 7,198,762 B1 | * | 4/2007 | Teboul | B01D 53/32 422/168 |
| 2005/0126135 A1 | * | 6/2005 | Kukla | F01N 3/01 55/309 |
| 2005/0167188 A1 | * | 8/2005 | Aisenbrey | B29C 45/0013 181/199 |
| 2006/0144236 A1 | * | 7/2006 | Le Boucq De Beaudignies | B03C 3/025 96/30 |
| 2010/0263964 A1 | * | 10/2010 | Kosaka | F02C 7/045 181/214 |
| 2012/0217088 A1 | * | 8/2012 | Colam | F16L 9/21 181/224 |
| 2014/0272252 A1 | * | 9/2014 | Golden | B64G 1/58 428/69 |
| 2015/0014179 A1 | * | 1/2015 | Doebber | C25D 7/008 205/333 |
| 2016/0032835 A1 | * | 2/2016 | Lutjen | F01D 11/12 60/39.092 |

* cited by examiner

*Primary Examiner* — Forrest M Phillips
(74) *Attorney, Agent, or Firm* — Ernest Cusick; Hoffman Warnick LLC

(57) ABSTRACT

A silencer panel includes an acoustic absorbing material; and an enclosure surrounding the acoustic absorbing material. The enclosure includes at least one plastic, perforated side wall. A first electrostatic particle removing electrode may be associated with the enclosure to remove particles from a working fluid in conjunction with a second electrostatic particle removing electrode.

22 Claims, 14 Drawing Sheets

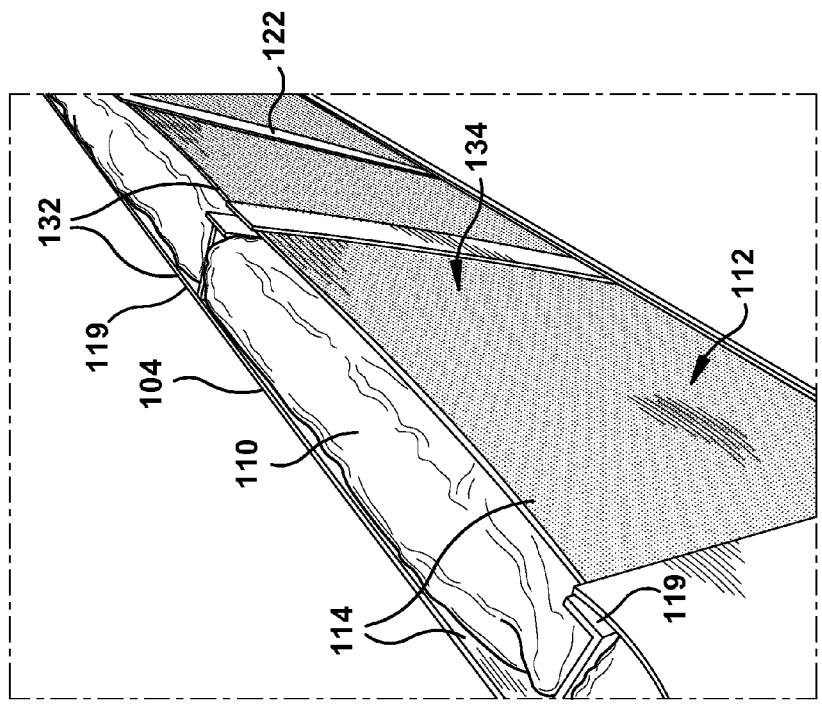
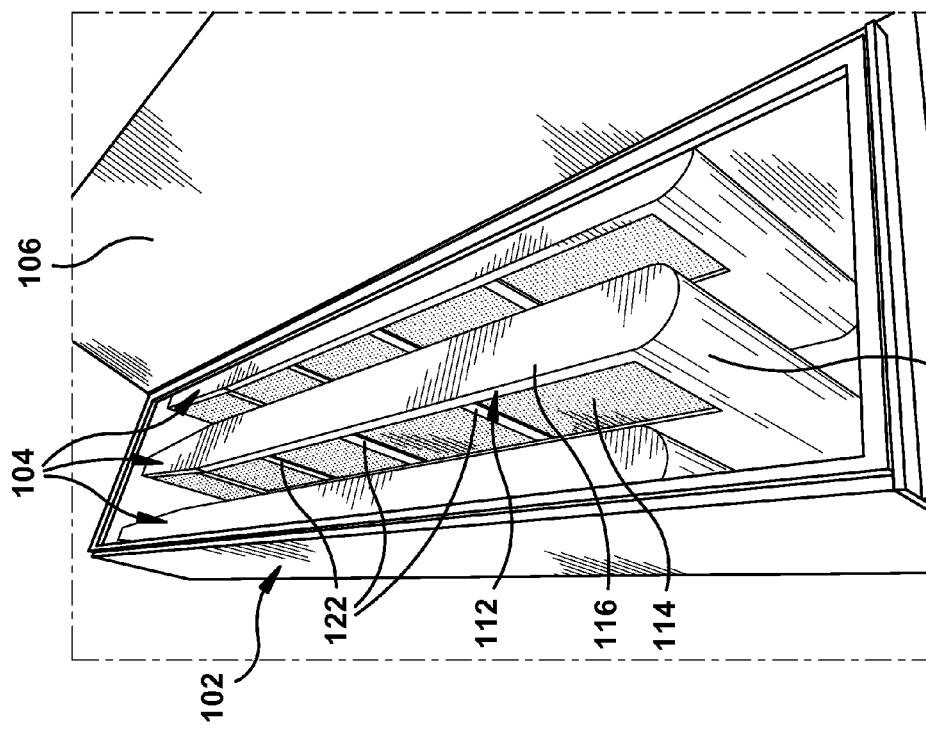

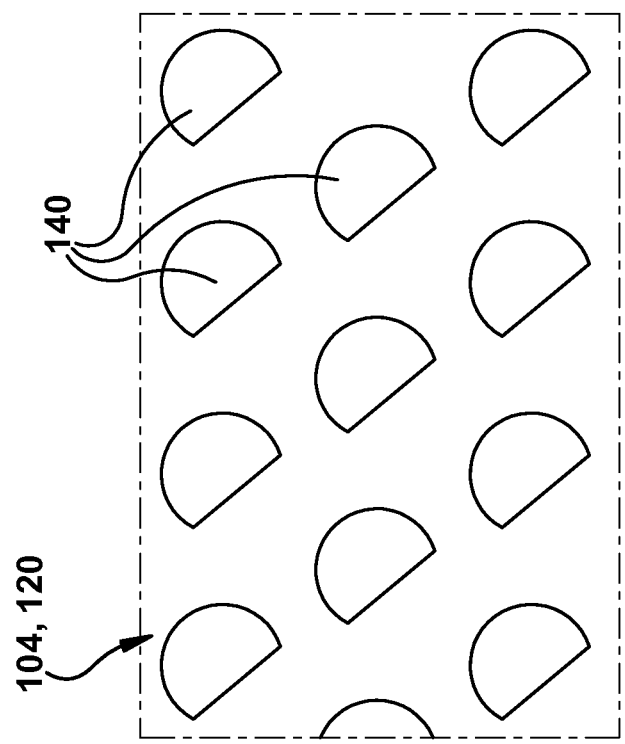
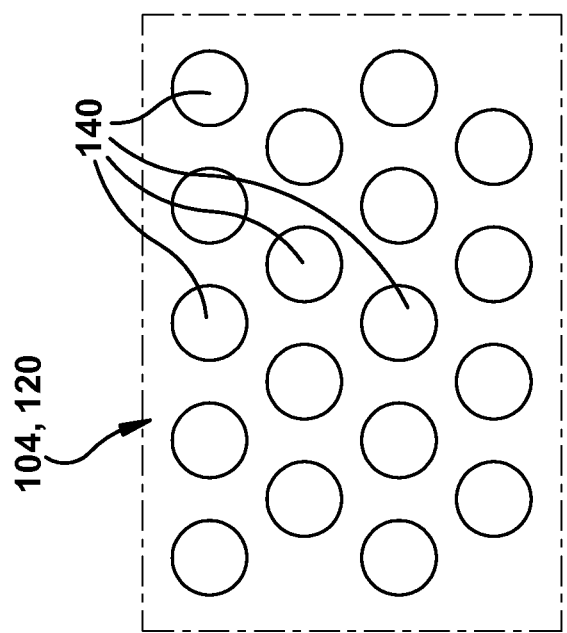

SILENCER PANEL AND SYSTEM FOR HAVING PLASTIC PERFORATED SIDE WALL AND ELECTROSTATIC PARTICLE REMOVAL

BACKGROUND OF THE INVENTION

The disclosure relates generally to acoustic attenuation, and more particularly, to a silencer panel and system including an enclosure having at least one plastic perforated side wall and an electrostatic particle removal system.

Noise reduction systems are used on a large variety of industrial machines such as turbomachines to reduce the acoustic impact to surrounding areas. In gas turbine systems, for example, noise reduction systems may be employed in the inlet duct, gas turbine enclosures and barrier walls. Traditionally, to attain the necessary acoustic reduction requirements, silencer panels and/or acoustically treated walls are used in the noisy areas. One mechanism to reduce acoustic impact is to treat walls with acoustic absorbing material. Another mechanism is to place silencer panels in areas where noise reduction is required to contain the acoustical energy, such as a working fluid flow path in an intake system duct to prevent noise escaping.

With regard to silencer panels, each panel typically includes an acoustic absorbing material such as mineral/glass wool wrapped with fiber glass cloth positioned by a metal supporting member and surrounded by an enclosure including stainless steel perforated sheets on the sides thereof. The sheets are held together by stainless steel end caps. The stainless steel perforated sheets are typically welded to the supporting members that hold the acoustic absorbing material. The perforated stainless steel sheets hold the acoustic absorbing material intact with the supporting members and propagate the sound waves through the perforations into the acoustic absorbing material. Use of stainless steel enclosures presents a number of challenges. For example, the enclosures are very heavy, and are also difficult and costly to manufacture due to the cost of the material and the need for welding to form the panels. In addition, the steel construction must be welded in place to the surrounding duct and must be custom fit for a particular sized duct.

Another challenge for certain industrial machines, such as gas turbines, is ensuring particle removal from incoming working fluids, e.g., air. For example, advanced gas turbines are using higher firing temperatures to achieve higher performance. Here, particle removal from the working fluid is desired to reduce particle build up, such as calcium magnesium-aluminosilicate (CMAS) build up, and more readily achieve and maintain the higher firing temperatures. Electrostatic particle removal has been employed in a variety of settings to remove particles from working fluids. Previously, however, use of this form of particle removal with all metal noise reduction systems employing silencer panels has not been feasible because the electrostatic discharge is shorted by the metal enclosures, and/or particle build up on the silencer panels diminishes and/or eliminates acoustic absorption by the panels.

BRIEF DESCRIPTION OF THE INVENTION

A first aspect of the disclosure provides a silencer panel comprising: an acoustic absorbing material; an enclosure surrounding the acoustic absorbing material, the enclosure including at least one plastic, perforated side wall; and a first electrostatic particle removing electrode associated with the enclosure to remove particles from a working fluid in conjunction with a second electrostatic particle removing electrode.

A second aspect of the disclosure provides a silencer system comprising: a frame forming a working fluid flow path; and a plurality of silencer panels positioned within the frame, each silencer panel including: an acoustic absorbing material; an enclosure surrounding the acoustic absorbing material, the enclosure including at least one plastic, perforated side wall; and a first electrostatic particle removing electrode associated with the enclosure to remove particles from a working fluid in conjunction with a second electrostatic particle removing electrode.

A third aspect of the disclosure provides a turbomachine inlet, comprising: an intake frame forming a working fluid flow, the intake frame operatively coupled to a compressor; a silencer system positioned within the intake frame, the silencer system including: a plurality of silencer panels positioned within the frame, each silencer panel including: an acoustic absorbing material; an enclosure surrounding the acoustic absorbing material, the enclosure including at least one plastic, perforated side wall; and a first electrostatic particle removing electrode associated with the enclosure to remove particles from a working fluid in conjunction with a second electrostatic particle removing electrode.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows an upper perspective view of silencer panels according to embodiments of the disclosure in position in a frame with an end panel of the frame open to reveal the silencer panels.

FIG. 4 shows an upper perspective view a single silencer panel according to embodiments of the disclosure with an end cap removed.

FIGS. 6-8 show views of various forms of perforations for the silencer panels according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a silencer panel and silencer system including at least one plastic, perforated side wall.

Figure 1:
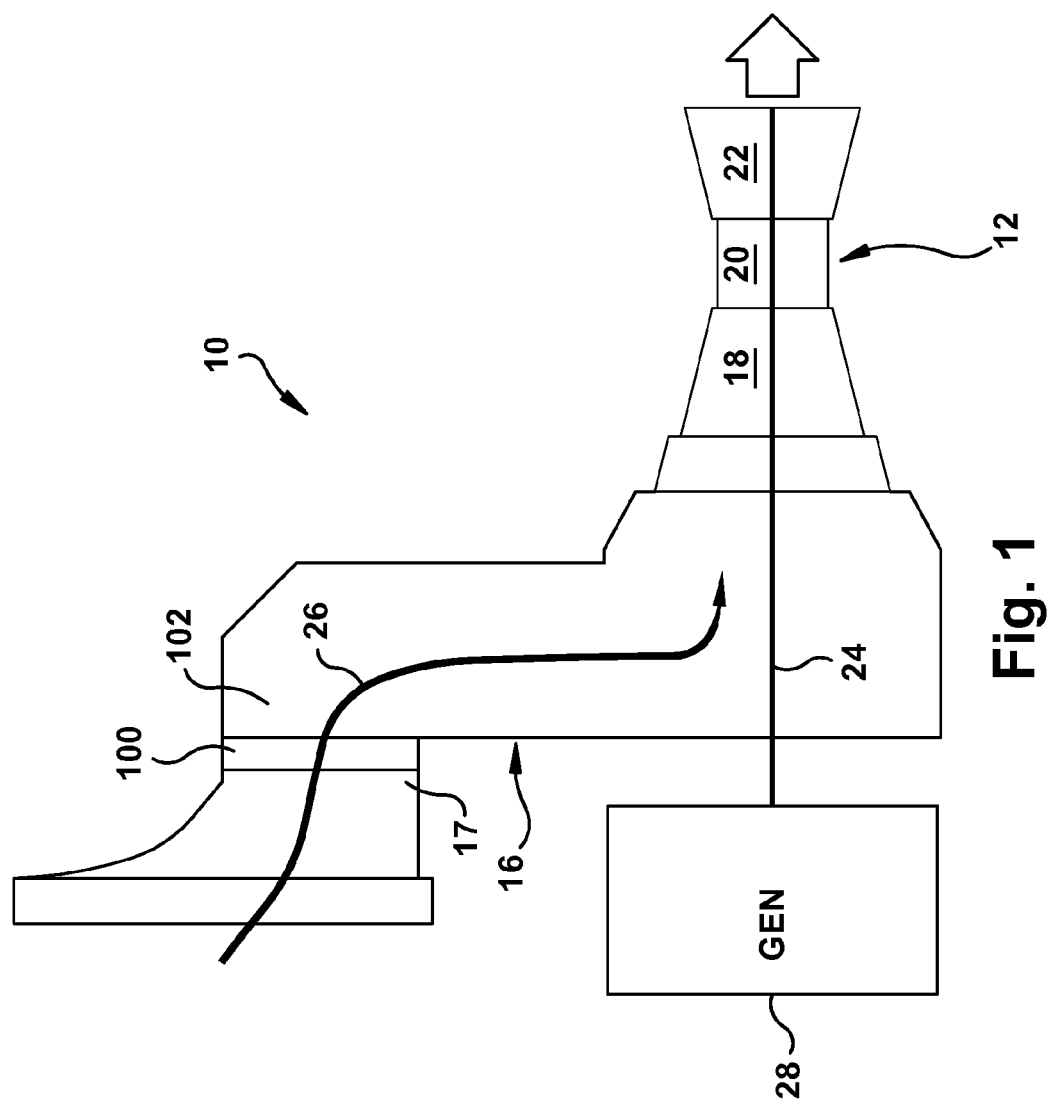
FIG. 1 shows a schematic view of an illustrative industrial machine employing a silencer panel and system according to embodiments of the disclosure.

Referring to the drawings, FIG. 1 depicts an illustrative industrial machine in the form of a turbomachine system 10 (e.g., simple cycle gas turbine power generation systems) that may include, among other things, a gas turbine system 12. Gas turbine system 12 may combust liquid or gas fuel, such as natural gas and/or a hydrogen-rich synthetic gas, to generate hot combustion gases to drive gas turbine system 12. Gas turbine system 12 includes an air intake section 16, a compressor 18, a combustor component 20, and a turbine component 22. Turbine component 22 is drivingly coupled to compressor 18 via a shaft 24. In operation, air (e.g., ambient air) enters gas turbine system 12 through air intake section 16 (indicated by arrow 26) and is pressurized in compressor component 18. Air intake section 16 may include an intake frame 17 for forming a working fluid flow therein. As illustrated, intake frame 17 is operatively coupled to compressor 18, which includes at least one stage including a plurality of compressor blades coupled to shaft 24. Rotation of shaft 24 causes a corresponding rotation of the compressor blades, thereby drawing air into compressor 18 via air intake section 16 and compressing the air prior to entry into combustor component 20.

Combustor component 20 may include one or more combustors. In embodiments, a plurality of combustors is disposed in combustor component 20 at multiple circumferential positions in a generally circular or annular configuration about shaft 24. As compressed air exits compressor component 18 and enters combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through turbine component 22 flow against and between the turbine blades, thereby driving the turbine blades and, thus, shaft 24 into rotation. In turbine component 22, the energy of the combustion gases is converted into work, some of which is used to drive compressor component 18 through rotating shaft 24, with the remainder available for useful work to drive a load such as, but not limited to, an electrical generator 28 for producing electricity, and/or another turbine. It is emphasized that turbomachine system 10 is simply illustrative of one application in which a silencer panel and system according to embodiments of the invention may be employed. As air flows through air intake system 16 and compressor component 18, noise is created such that a silencer system 100 according to embodiments of the invention is employed to reduce the noise.

Figure 2:
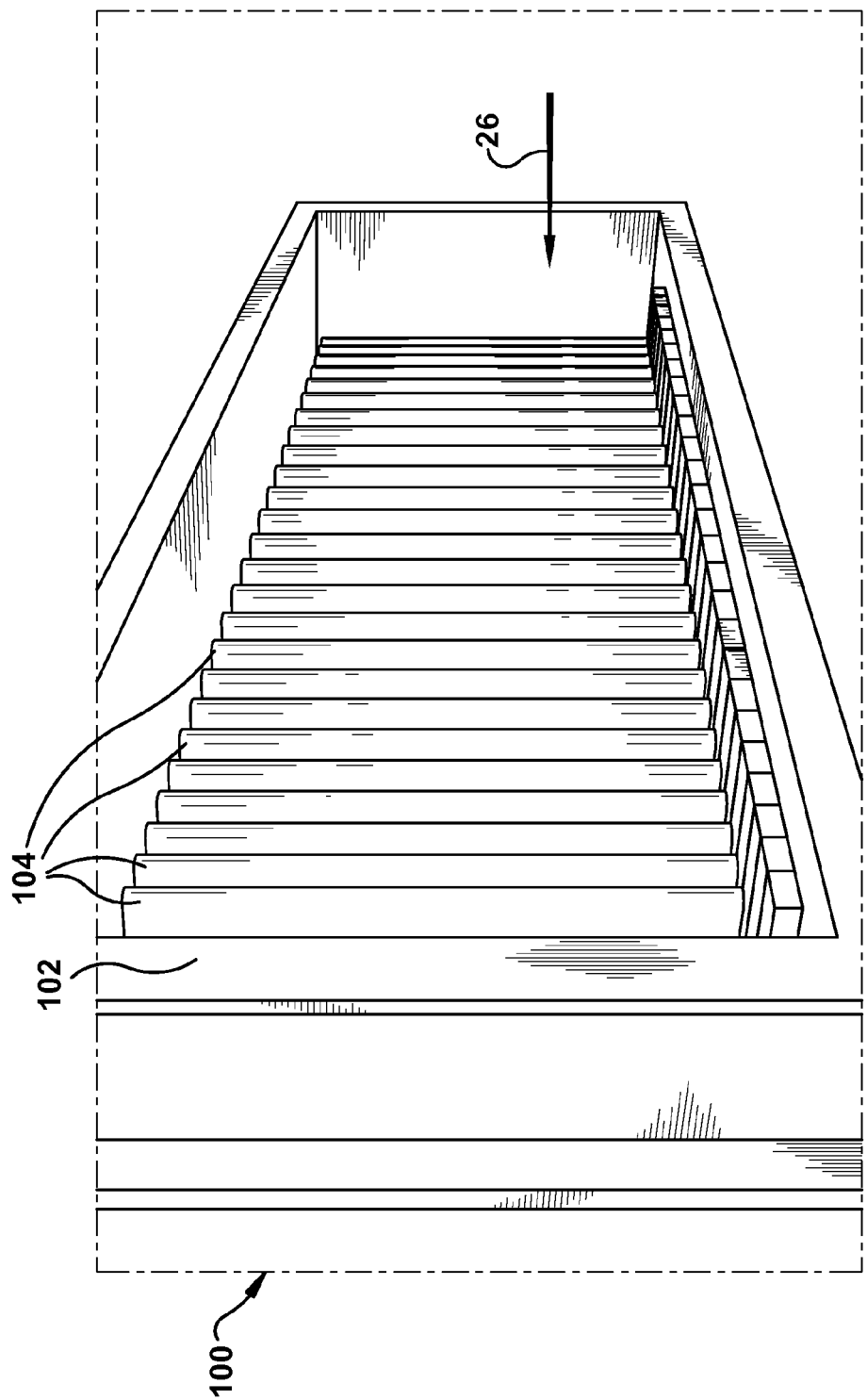
FIG. 2 shows a front perspective view of an intake system frame employing a silencer panel and system according to embodiments of the disclosure.

FIG. 2 shows front perspective view of a silencer system 100 including a frame 102 (e.g., intake frame 17 (FIG. 1)) forming a working fluid flow, 26, path or duct, and FIG. 3 shows an upper perspective view of a silencer panel 104 in position in frame 102 with an end panel 106 of frame 102 open to reveal silencer panels 102. Frame 102 may include any now known or later developed intake frame made of, for example, steel, galvanized steel or other structural metal, and sized for a particular compressor 18 (FIG. 1) and/or industrial machine. As understood, frame 102 can come in a large variety of sizes.

As shown in FIG. 2, a plurality of silencer panels 104 according to embodiments of the invention is positioned within frame 102. The panels may be evenly spaced across a width of the frame. Each silencer panel 104 may be configured to be positioned within frame 102 in a variety of ways, e.g., by fasteners such as screws through end panel 106 (FIG. 3) of frame 102, mating channels, tongue-and-groove mating elements, etc. Each silencer panel 104 may include appropriate structure to accommodate the particular type of positioning mechanism employed.

Figure 5:
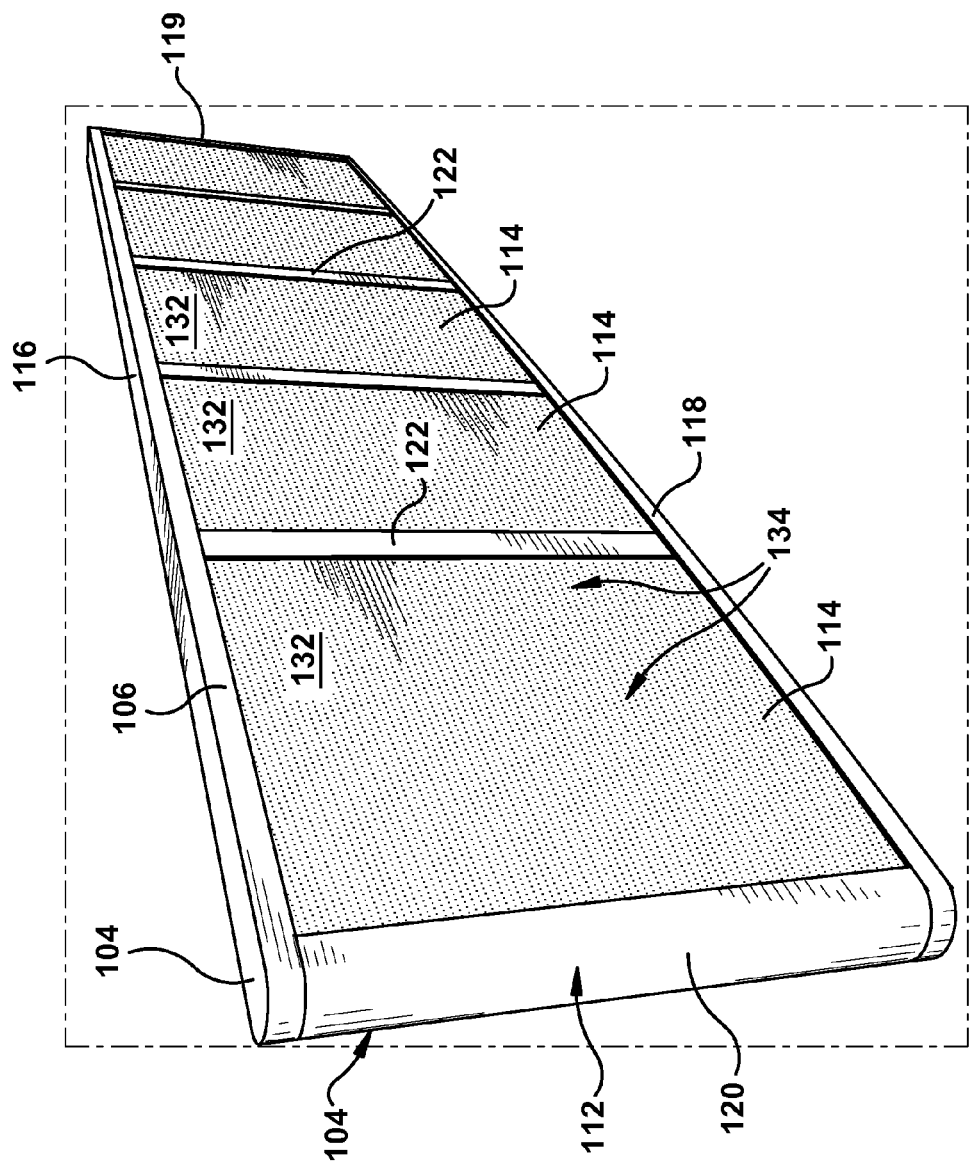
FIG. 5 shows a front perspective view of a silencer panel according to embodiments of the disclosure.

FIG. 4 shows an upper perspective view a single silencer panel 104 with an end cap removed, and FIG. 5 shows a front perspective view of a whole single silencer panel 104. Referring to FIGS. 3-5, collectively, each silencer panel 104 includes an acoustic absorbing material 110 (FIG. 4 only) and an enclosure 112 surrounding acoustic absorbing material 110. Acoustic absorbing material 110 may include any now known or later developed sound absorbing material such as but not limited to at least one of: foam, mineral wool, rock wool and fiberglass. The foam may be reticulated, or otherwise called open cell foam. In contrast to conventional systems, enclosure 112 according to embodiments of the disclosure includes at least one plastic, perforated side wall 114. In addition, although not necessary in all instances, an upper and a lower end cap 116, 118 (FIG. 5) and side end cap 119 (FIGS. 4-5) of silencer panel 104 may also be made of the plastic. End caps 116, 118 include a panel shaped to enclose acoustic absorbing material 110 by overlapping and/or engaging side panels 114, and side end caps 119 also include a panel shaped to enclose acoustic absorbing material 110 by overlapping and/or engaging side panels 114. As an option, enclosure 112 may also include a plastic, rounded nose portion 120, but this may not be necessary in all instances. Nose portion 120 may also be made of other materials, such as stainless steel. As shown best in FIGS. 3 and 5, enclosure 112 may also optionally include a structural support 122 positioned between adjacent portions of side walls 114, where the side wall is optionally portioned. Each structural support 120 is made of the plastic, and has a shape and size to provide structural support to side walls 114. End caps 116, 118, side walls 114, nose portion 120 and/or structural supports 122 may be coupled together in any now known or later developed fashion, e.g., fasteners such as screws or nuts/bolts, interlocking snap engagement elements, threaded inserts, welding, etc. The coupling mechanisms may also be made of plastic, if appropriate for the setting.

Figure 8:
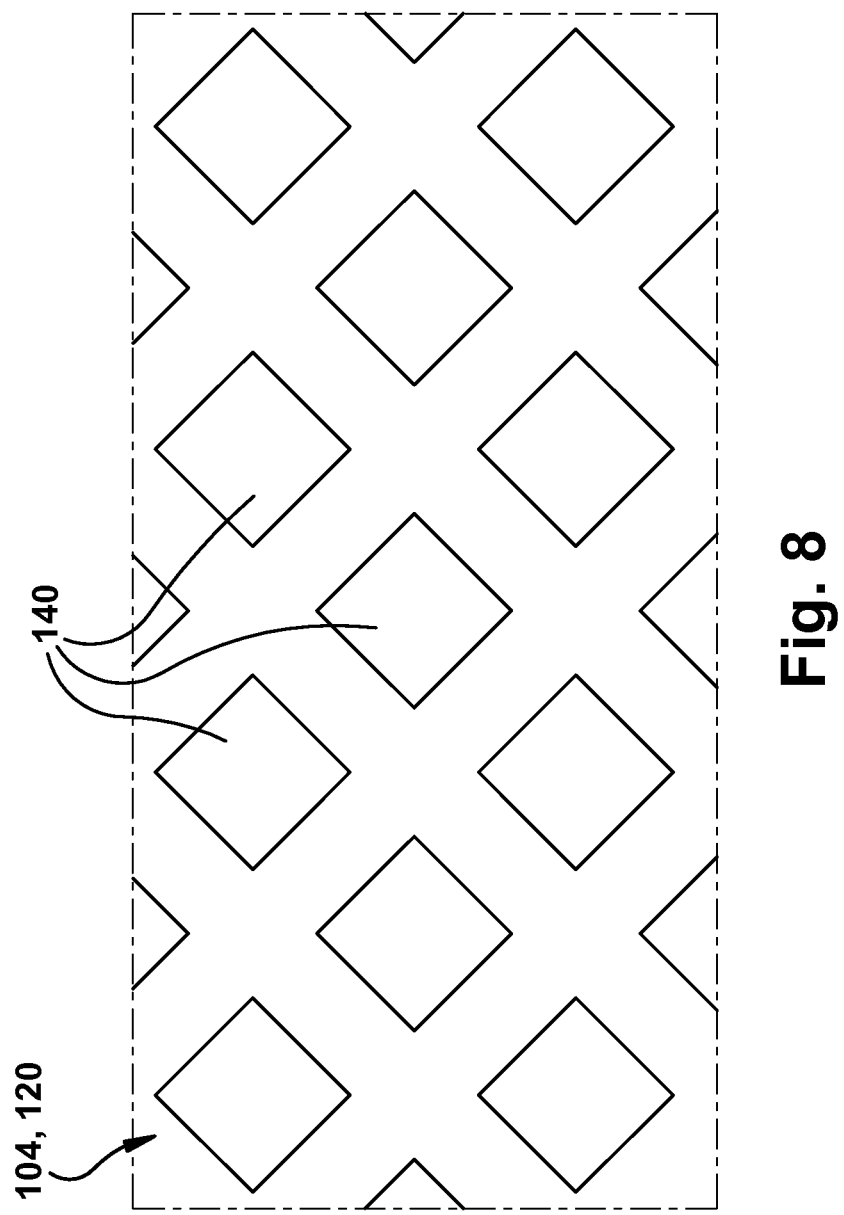

The plastic may include, for example, polyvinyl chloride (PVC), polypropylene(PP), polypropylene co-polymer (PPC), polypropylene homo-polymer (PPH), polyethylene (PE), high density polyethylene (HDPE) or any other plastic capable of withstanding the environmental and operational characteristics of the particular frame 102 (FIG. 3) and/or industrial machine in which the panel is employed. As shown in FIGS. 4 and 5 best, each plastic, perforated side wall 114 may include a planar sheet 132 of plastic having perforations 134 therein. As shown in FIG. 6, each perforation may take the form of a hole 140 extending through side wall 104. Alternatively, as shown in FIGS. 7 and 8, each perforation may include a different geometry of the openings (FIG. 7 and FIG. 8). Other shapes such as diamond, triangular, rectangular, etc. may also be possible.

Figure 9:
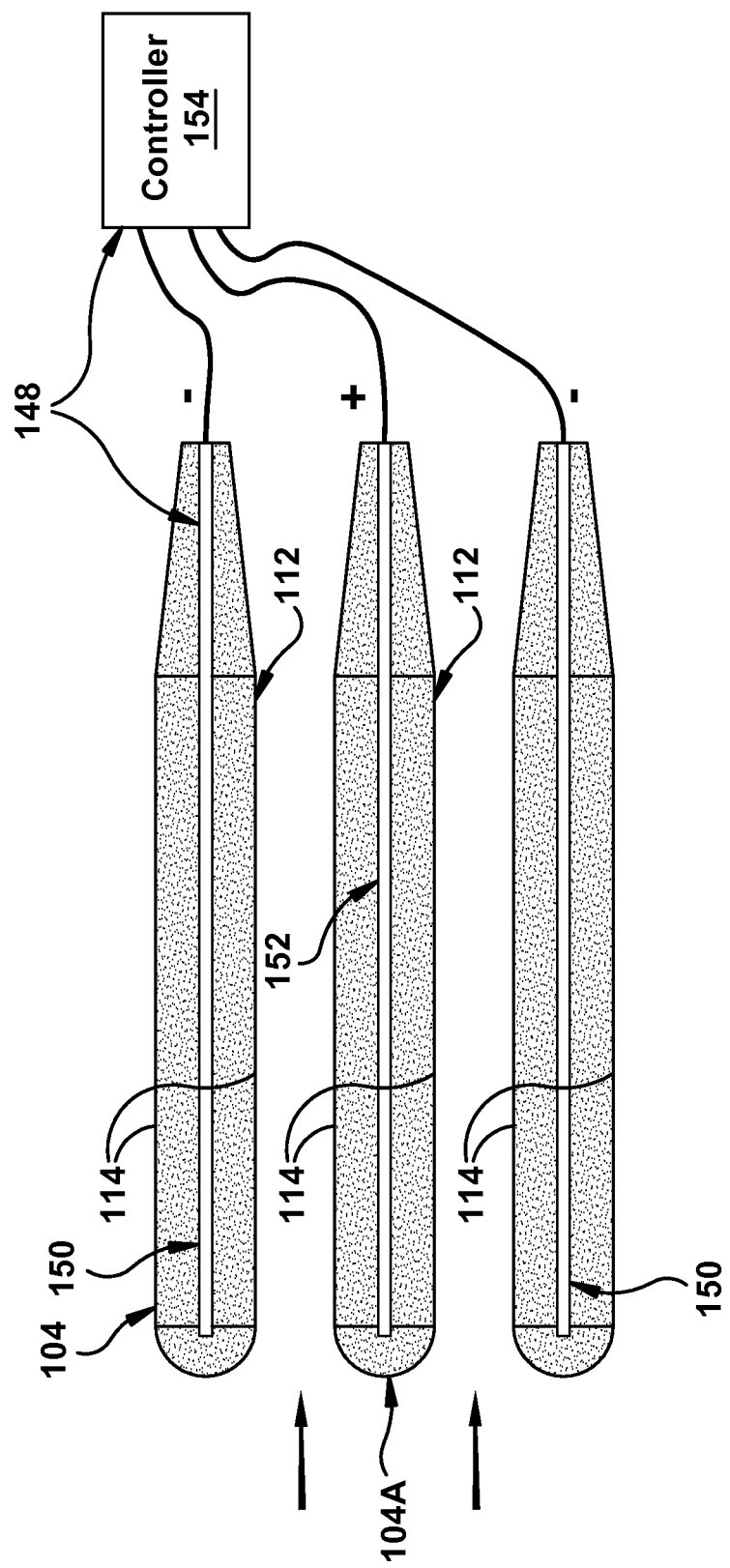
FIG. 9-11 show plan views of various electrostatic particle removal systems according to embodiments of the disclosure.
Figure 10:
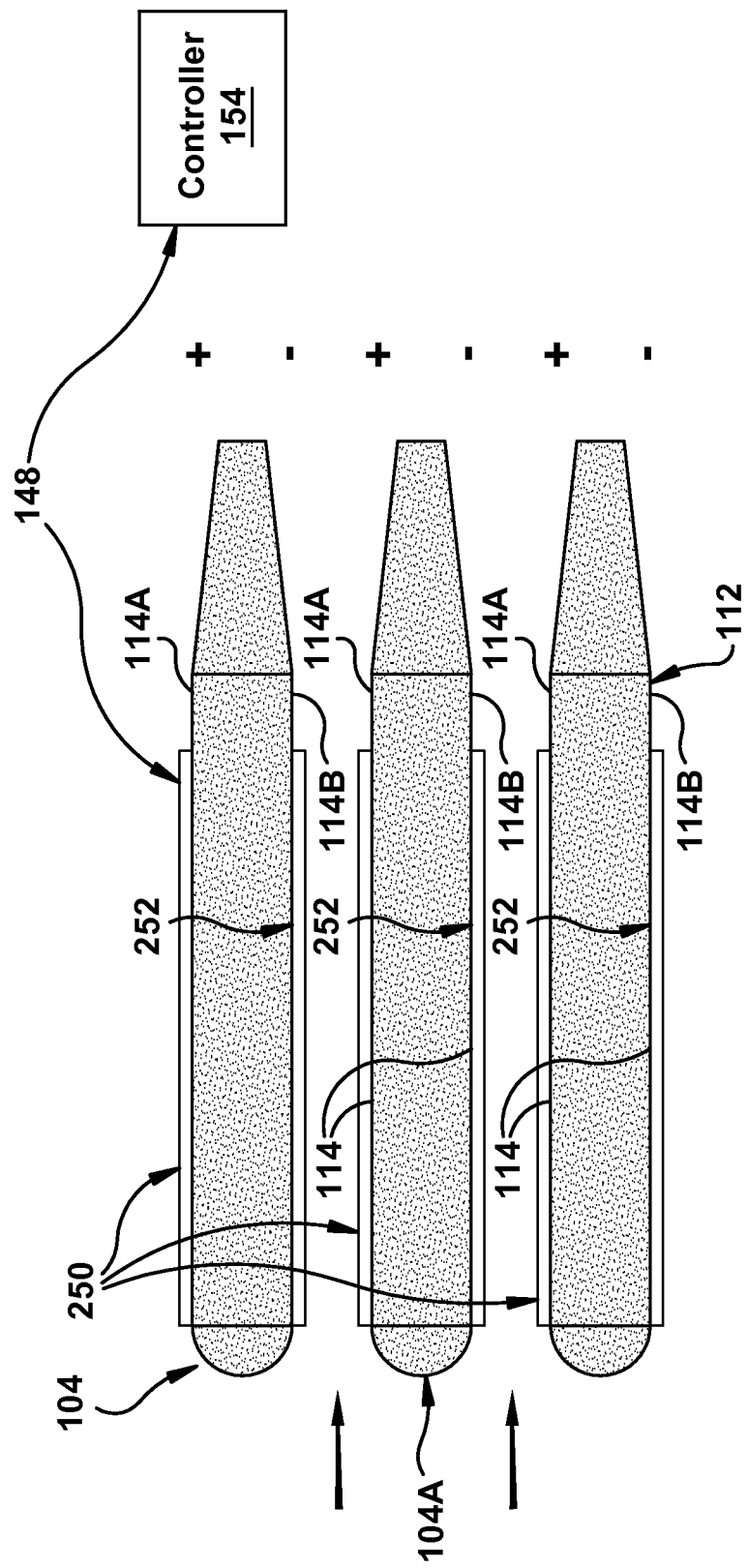
Figure 11:
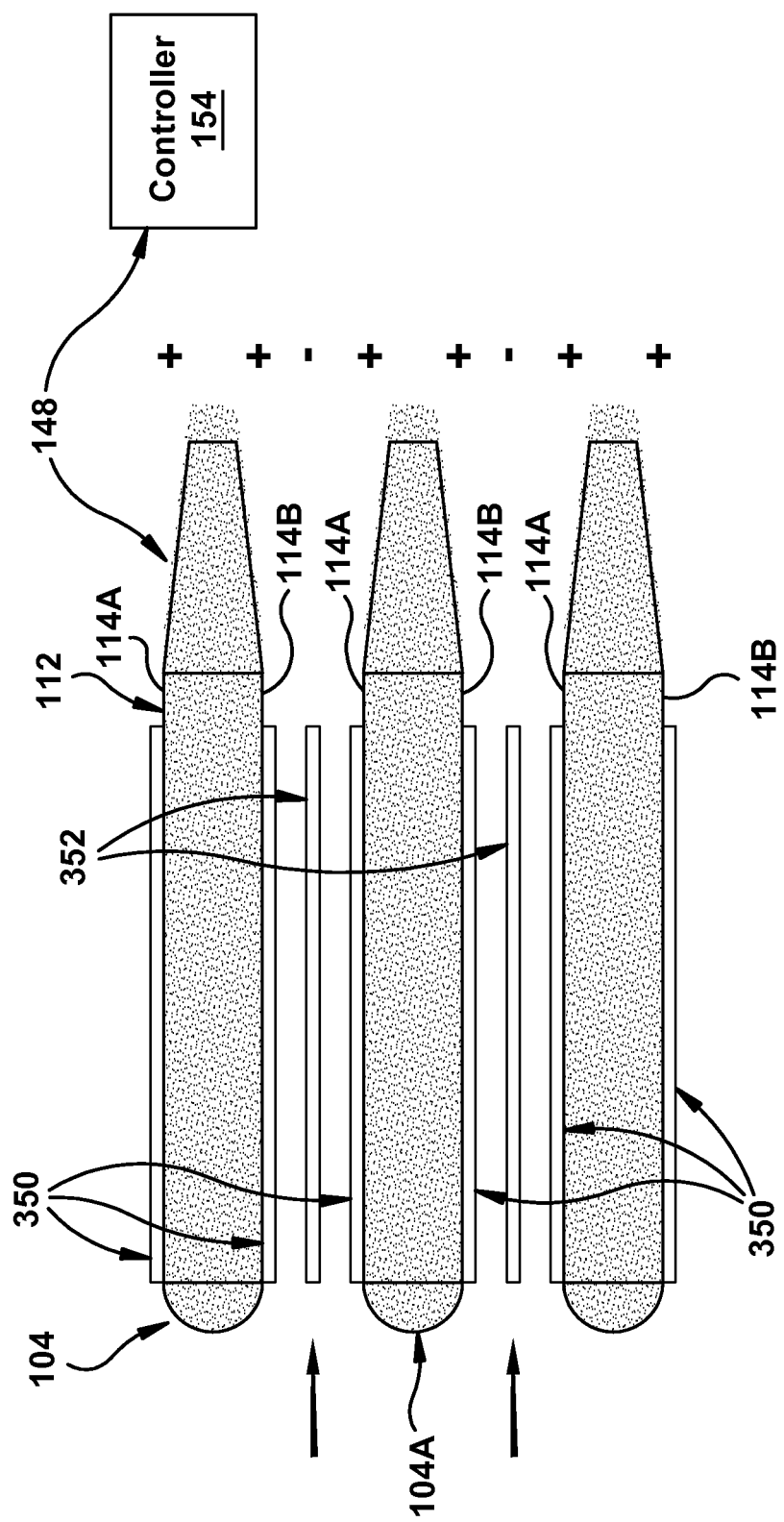

Referring to FIGS. 9-11, a silencer panel and system including an electrostatic particle removing system 148 according to embodiments of the disclosure is illustrated. FIGS. 9-11 show plan views of various silencer panels and systems including various embodiment of electrostatic particle removing system 148, with end caps 116 (FIG. 5) removed, and FIGS. 12-16 show side views of various forms of electrodes used with system 148. In embodiments of system 148, silencer panel 104 as described herein may further include a first electrostatic particle removing electrode 150 (FIG. 9), 250 (FIG. 10), 350 (FIG. 11) associated with enclosure 112 to remove particles from a working fluid (arrows in FIGS. 9-11) in conjunction with a second electrostatic particle removing electrode 152 (FIG. 9), 252 (FIG. 10), 352 (FIG. 11). As shown in FIGS. 9-11, each embodiment includes a controller 154 for electrostatically charging first and second electrostatic particle removing electrodes. Controller 154 may include any now known or later developed electronic control system for applying a potential to each electrode to create an electrostatic field that attracts particles to one or more of the electrodes. Although particular positive and negative charges have been indicated, they are only illustrative and may be reversed or otherwise arranged. Since silencer panel 104 and in particular side walls 114 are made of plastic, electrostatic particle removal is possible since particles will be attracted solely to the metal parts of system 148 and not to the silencer panels overall. Accordingly, the silencer panels can continue to function to absorb acoustics while particles are removed by system 148 and the related electrodes, and no shorting of the charges occur. As will be described, each electrode and the arrangement of electrodes within system 148 may take a variety of forms.

In one embodiment, shown in FIG. 9, first electrostatic particle removing electrode 150, is positioned within enclosure 112 of silencer panel 104. In this instance, first electrode 150 may include a metal element positioned with the acoustic absorbing material within a respective enclosure. The metal element may take a variety of forms including but not limited to: a metal plate, metal mesh, a metal wire, etc. (Former pair may extend into the page). Although first electrode 150 is shown as embedded within acoustic absorbing material 110, that arrangement is not necessary in all instances, e.g., it may be positioned between acoustic absorbing material 110 and perforated wall(s) 114. As will be described, second electrostatic particle removing electrode may take a variety of forms. In FIG. 9, second electrostatic particle removing electrode 152 is positioned within enclosure 112 of an adjacent silencer panel 104A in an identical manner as first electrode 150 is within enclosure 112 of panel 104. In this embodiment, each electrode/metal element may be positioned in any fashion, e.g., by positioners on end cap(s) 116, 118 (FIG. 5), by fasteners, etc.

Turning to FIGS. 10 and 11, in alternative embodiments, first electrostatic particle removing electrode 250, 350 (shown as thicker lines), respectively, may be positioned on the at least one plastic, perforated side wall 114. In FIG. 10, enclosure 112 includes a first plastic, perforated side wall 114A spaced from a second plastic, perforated side wall 114B, i.e., both side walls of enclosure 112 are plastic. Here, first electrostatic particle removing electrode 250 is positioned on first plastic, perforated side wall 114A, and second electrostatic particle removing electrode 252 is positioned on second, plastic perforated side wall 114B. In FIG. 11, first electrostatic particle removing electrode 350 is positioned on first plastic, perforated side wall 114A and second, plastic perforated side wall 114B, and second electrostatic particle removing electrode 352 is positioned adjacent to and spaced from plastic, perforated side wall(s) 114A, 114B and each first electrostatic particle removing electrode 350. That is, first electrode 350 has two parts, one on each plastic, perforated side wall 114, 114A, and second electrode 352 is positioned spaced between silencer panels, e.g., 104, 104A. In FIG. 11, second electrode 352 may include a metal element, which may take a variety of forms including but not limited to: a metal plate, metal mesh, a metal wire, etc. (Former pair may extend into the page).

Figure 12:
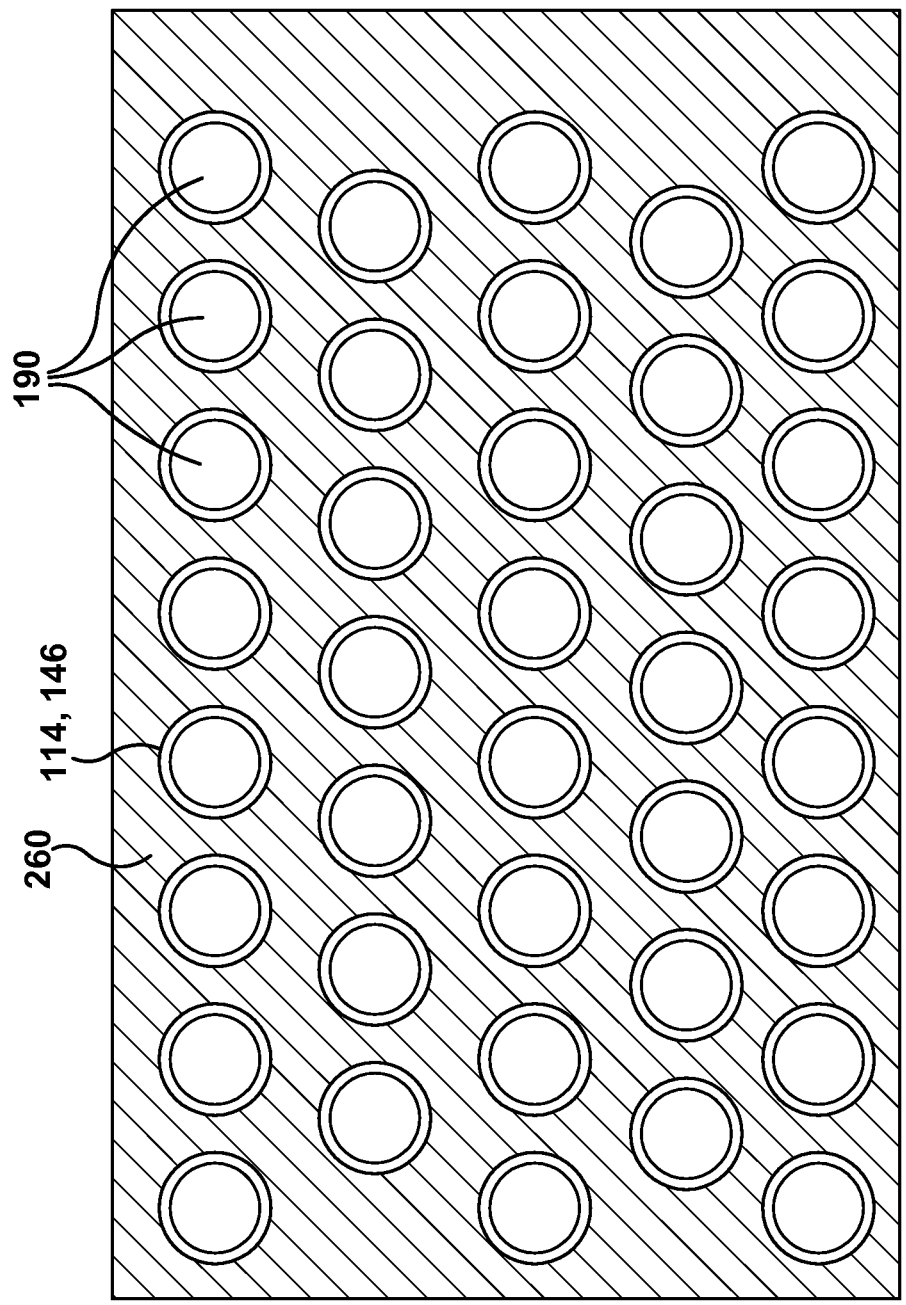
FIGS. 12-16 show side views of various forms of electrodes for the electrostatic particle removal systems of FIGS. 9-11.
Figure 13:
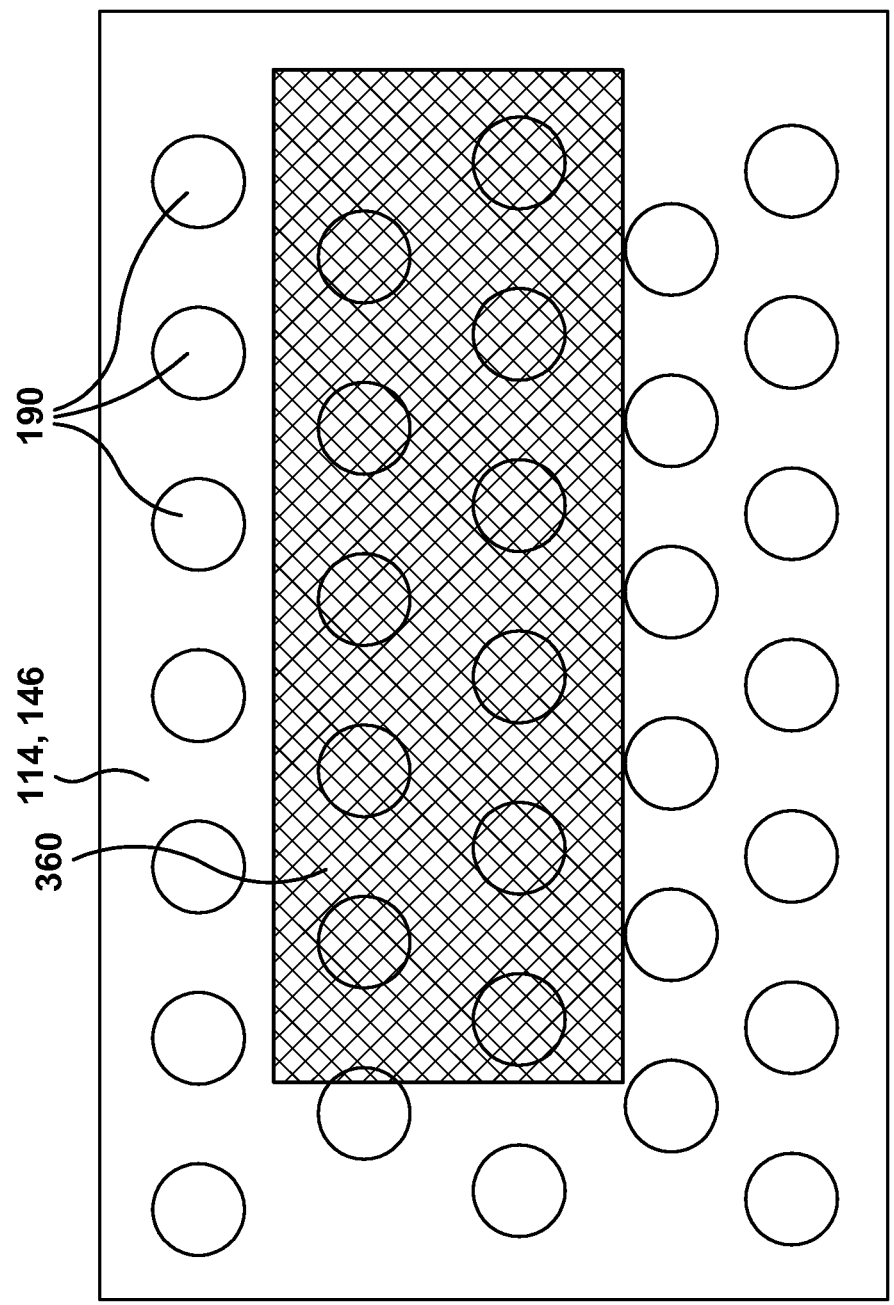
Figure 14:
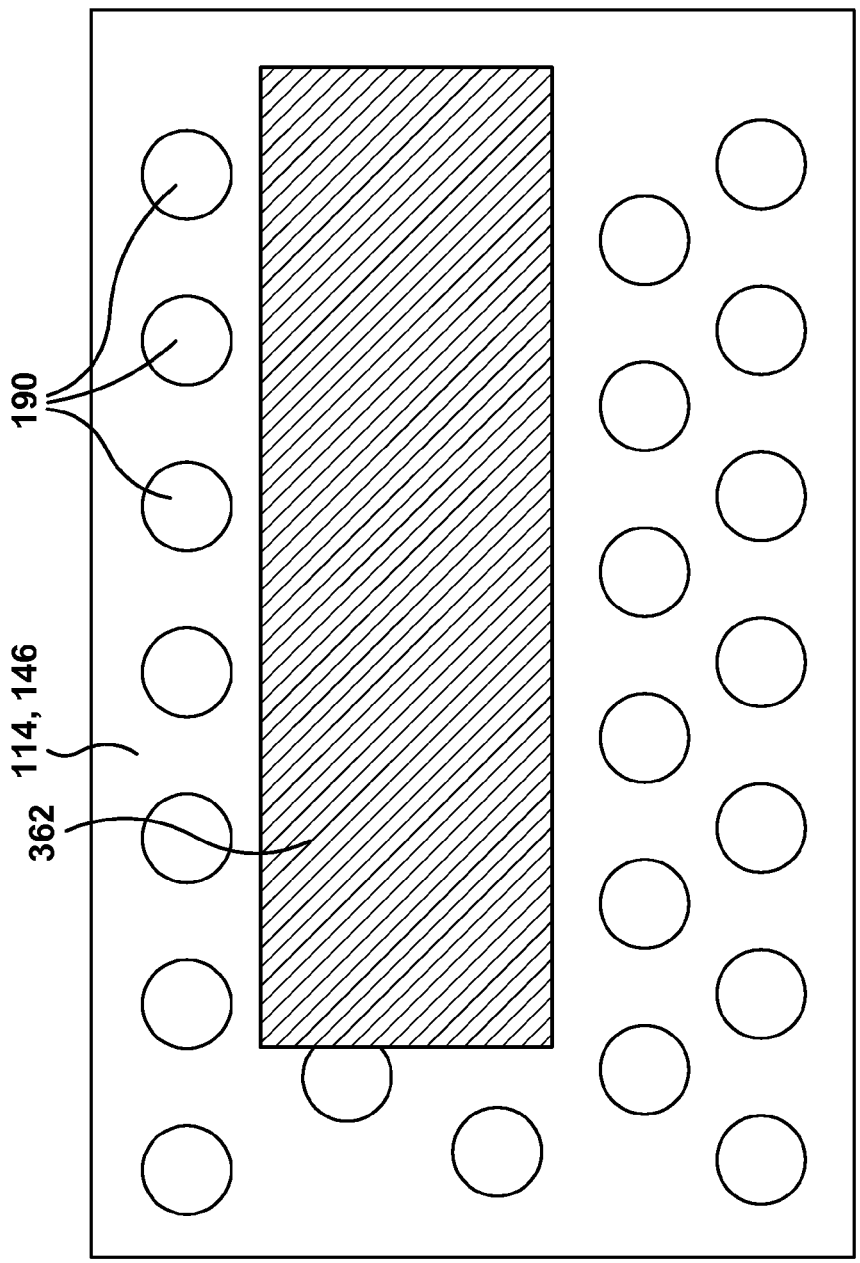

FIGS. 12-14 show side views of side walls 114 employing various embodiments of electrodes. Referring to FIG. 12, in the FIGS. 10 and 11 embodiments, first electrodes 250, 350, and second electrode 252 in FIG. 10, may be provided as a metal layer 260 on a respective plastic, perforated side wall 114A and/or 114B. As shown, metal layer 260 may be provided on a surface 146 of plastic side wall(s) 114 and around perforations 190 (shown here as holes 140 in the FIG. 6 embodiment, but could also be as shown in FIGS. 7 and 8). Metal layer 260 can be applied using any now known or later developed method such as but not limited to: an adhered foil; deposition such as chemical vapor deposition (CVD); metal sputtering; spray or painting application; etc.

Figure 15:
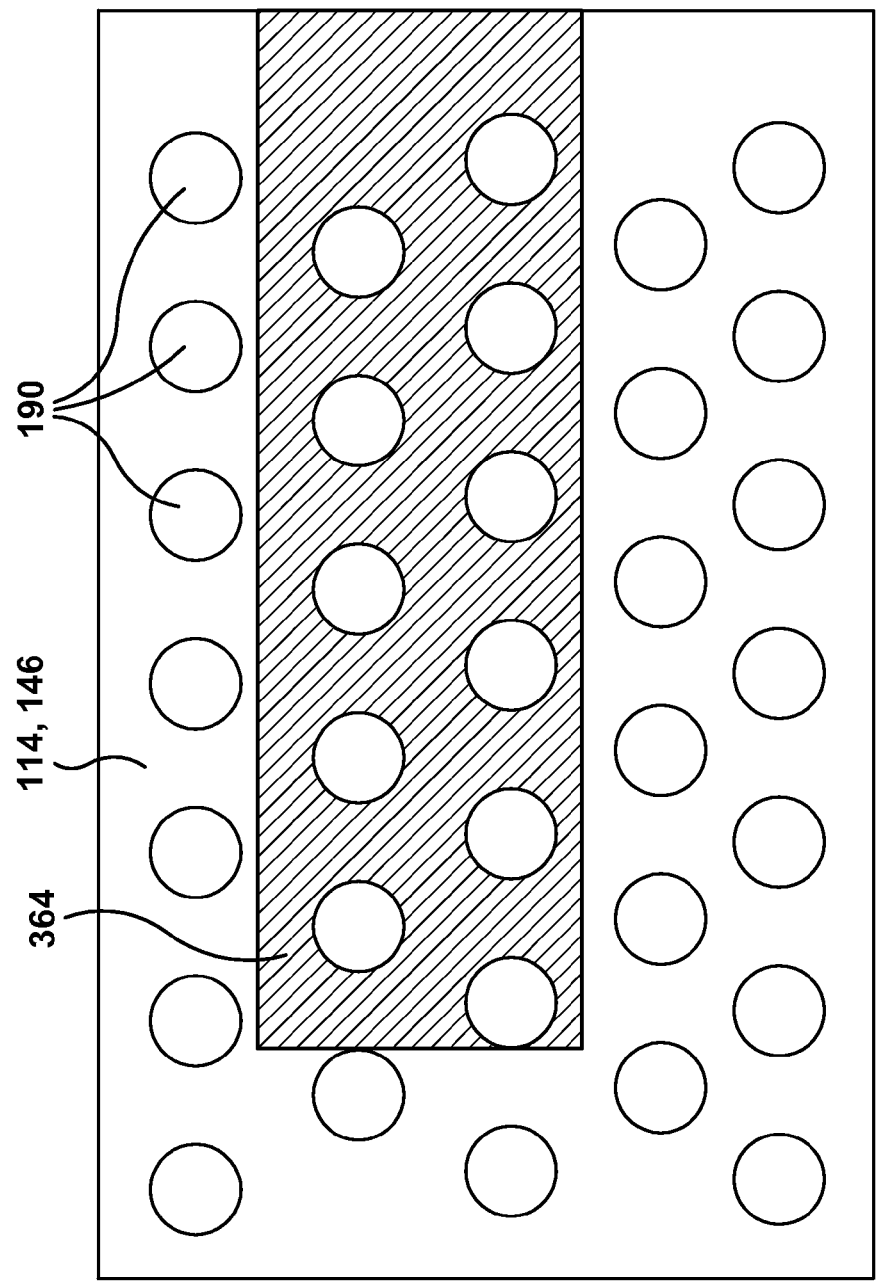
Figure 16:
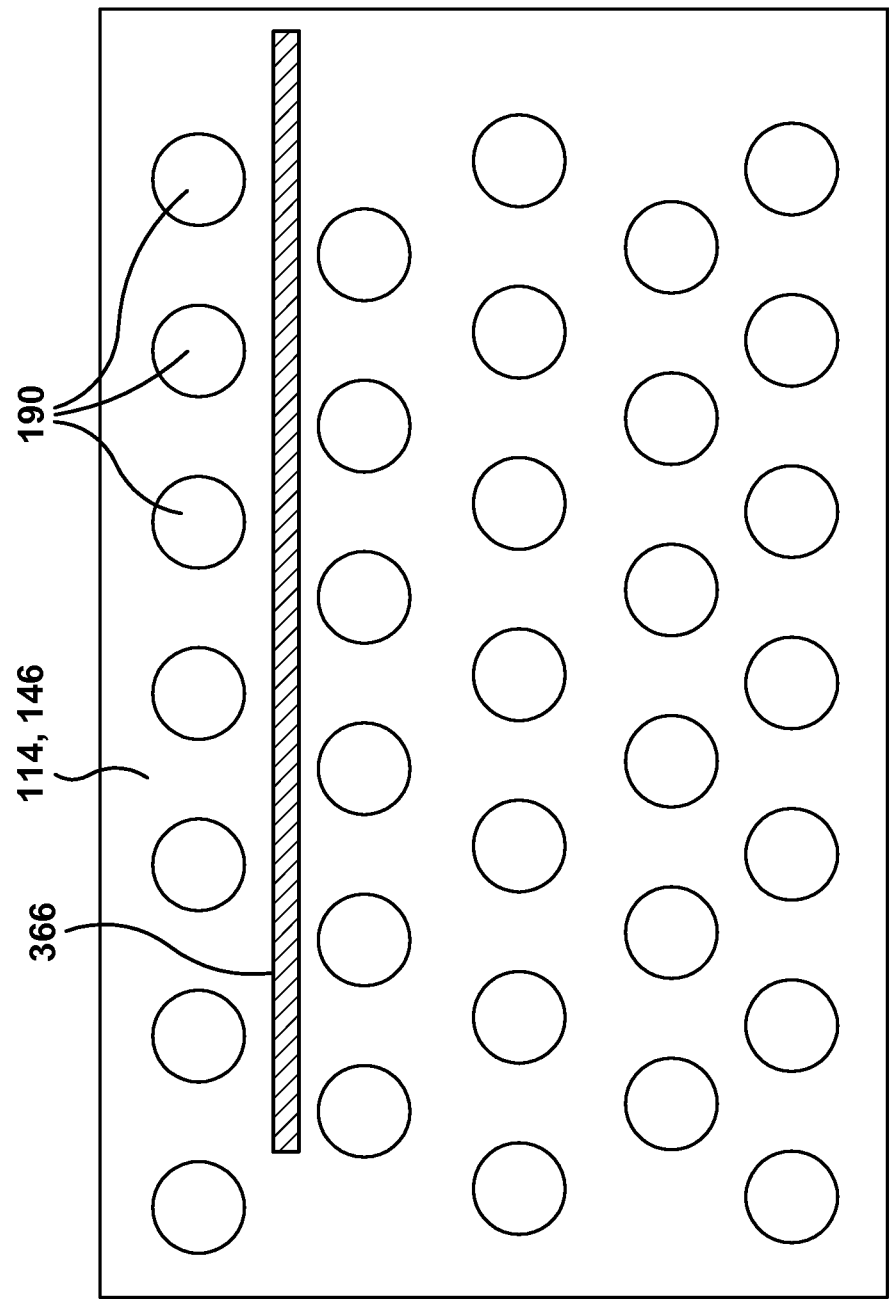

In alternative embodiments, shown in FIGS. 13-15, first electrodes 250, 350, and second electrode 252 in FIG. 10, i.e., those electrodes adjacent (on or against) side wall 114, 114A, may take at least one of a variety of other forms. As shown in FIG. 13, electrode(s) may include a metal mesh 360 adjacent a respective plastic, perforated side wall 114. As shown in FIG. 14, electrode(s) may include a metal plate 362 adjacent a respective plastic, perforated side wall 114. Metal plate 362 may block some perforations 190 in side wall 114. As shown in FIG. 15, electrode(s) may include a perforated metal plate 364 adjacent a respective plastic, perforated side wall 114. Perforated metal plate 364 is shown positionally matching perforations 190, but this is not necessary in all instances. The perforations in metal plate 364 may take the form of any shape shown in FIGS. 6-8. Finally, as shown in FIG. 16, electrode(s) may include a metal wire(s) 366 adjacent a respective plastic, perforated side wall 114. While one wire 366 is shown, it is understood that a number of wires may be employed. Any of the afore-described electrode embodiments may be employed alone or in combination.

Regardless of the form of electrode described herein, any necessary form of electrical wiring connection necessary to controller 154 may be employed, e.g., metal traces, wires, etc. Embodiments of any of the electrodes described herein can cover all or part of plastic, perforated side wall 114. Further, the metal of the electrodes can be any conductive metal capable of withstanding the environment of the industrial machine, e.g., steel, stainless steel, aluminum, etc.

While not described herein, it is understood that, where possible, system 148 and/or the various electrodes may include any now known or later developed cleaning system and/or particle removing system, e.g., vibration systems, reverse potential systems, vacuum systems, etc., to force particles from the electrodes for removal.

Enclosure 112 made of perforated, plastic side walls 114 provides a number of advantages over conventional steel panels. For example, silencer panels 104 have reduced weight and are easier to handle, have reduced cost, and are easier to fabricate because of the elimination of extensive welding between sheets and supporting members. In addition, the plastic may provide slightly enhanced acoustic performance (e.g., a higher decibel (dB) attenuation of approximately, for example, 2 dB or above overall attenuation), and may allow increased perforation area opening percentages compared to steel panels. Further, the plastic allows application of electrostatic particle removal system 148 as described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A silencer panel comprising:
an acoustic absorbing material;
an enclosure surrounding the acoustic absorbing material, the enclosure including at least one plastic, perforated side wall; and
a first electrostatic particle removing electrode extending parallel to at least one plastic, perforated side wall, the first electrostatic particle removing electrode configured to remove particles from a working fluid in conjunction with a second electrostatic particle removing electrode;
wherein the first electrostatic particle removing electrode is axially aligned with a flow direction of the working fluid.

2. The silencer panel of claim 1, wherein the first electrostatic particle removing electrode is positioned on the at least one plastic, perforated side wall.

3. The silencer panel of claim 2, wherein the second electrostatic particle removing electrode is positioned adjacent to and spaced from the at least one plastic, perforated side wall and the first electrostatic particle removing electrode.

4. The silencer panel of claim 1, wherein the enclosure includes a first plastic, perforated side wall spaced from a second plastic, perforated side wall, and the first electrostatic particle removing electrode is positioned on the first plastic, perforated side wall and the second electrostatic particle removing electrode is positioned on the second, plastic perforated side wall.

5. The silencer panel of claim 1, wherein the first electrostatic particle removing electrode is positioned within the enclosure, and the second electrostatic particle removing electrode is positioned within the enclosure of an adjacent silencer panel.

6. The silencer panel of claim 4, wherein each electrostatic particle removing electrode includes a metal element positioned with the acoustic absorbing material within a respective enclosure.

7. The silencer panel of claim 6, wherein the first electrostatic particle removing electrode includes at least one of: a metal mesh, a metal plate, a perforated metal plate.

8. The silencer panel of claim 1, wherein at least the first electrostatic particle removing electrode includes at least one of: a metal layer on a respective plastic, perforated side wall; a metal mesh adjacent a respective plastic, perforated side wall; a metal plate adjacent a respective plastic, perforated side wall; a perforated metal plate adjacent a respective plastic, perforated side wall; a metal wire adjacent a respective plastic, perforated side wall.

9. The silencer panel of claim 1, further comprising a controller for electrostatically charging the first and second electrostatic particle removing electrodes.

10. The silencer panel of claim 1, wherein the acoustic absorbing material includes at least one of: mineral wool, rock wool and fiberglass.

11. The silencer panel of claim 1, wherein a plastic of the at least one plastic, perforated side wall is chosen from the group consisting of: polyvinyl chloride (PVC), polypropylene(PP), polypropylene co-polymer (PPC), polypropylene homo-polymer (PPH), polyethylene (PE) and high density polyethylene (HDPE).

12. A silencer system comprising:
a frame forming a working fluid flow path; and
a plurality of silencer panels positioned within the frame, each silencer panel including:
an acoustic absorbing material;
an enclosure surrounding the acoustic absorbing material, the enclosure including at least one plastic, perforated side wall; and
a first electrostatic particle removing electrode extending parallel to at least one plastic, perforated side wall, the first electrostatic particle removing electrode configured to remove particles from a working fluid in conjunction with a second electrostatic particle removing electrode;
wherein the first electrostatic particle removing electrode is axially aligned with a flow direction of the working fluid.

13. The silencer system of claim 12, wherein the first electrostatic particle removing electrode is positioned on the at least one plastic, perforated side wall.

14. The silencer system of claim 13, wherein the second electrostatic particle removing electrode is positioned adjacent to and spaced from the at least one plastic, perforated side wall and the first electrostatic particle removing electrode.

15. The silencer system of claim 12, wherein the enclosure includes a first plastic, perforated side wall spaced from a second plastic, perforated side wall, and the first electrostatic particle removing electrode is positioned on the first plastic, perforated side wall and the second electrostatic particle removing electrode is positioned on the second, plastic perforated side wall.

16. The silencer system of claim 12, wherein the first electrostatic particle removing electrode is positioned within the enclosure, and the second electrostatic particle removing electrode is positioned within the enclosure of an adjacent silencer panel.

17. The silencer system of claim 15, wherein each electrostatic particle removing electrode includes a metal element positioned with the acoustic absorbing material within a respective enclosure.

18. The silencer system of claim 17, wherein the first electrostatic particle removing electrode includes at least one of: a metal mesh, a metal plate, a perforated metal plate.

19. The silencer system of claim 12, wherein at least the first electrostatic particle removing electrode includes at least one of: a metal layer on a respective plastic, perforated side wall; a metal mesh adjacent a respective plastic, perforated side wall; a metal plate adjacent a respective plastic, perforated side wall; a perforated metal plate adjacent a respective plastic, perforated side wall; a metal wire adjacent a respective plastic, perforated side wall.

20. The silencer system of claim 12, further comprising a controller for electrostatically charging the first and second electrostatic particle removing electrodes.

21. The silencer system of claim 12, wherein a plastic of the at least one plastic, perforated side wall is chosen from the group consisting of: polyvinyl chloride (PVC), polypropylene(PP), polypropylene co-polymer (PPC), polypropylene homo-polymer (PPH), polyethylene (PE) and high density polyethylene (HDPE).

22. A turbomachine inlet, comprising:

an intake frame forming a working fluid flow, the intake frame operatively coupled to a compressor;

a silencer system positioned within the intake frame, the silencer system including:

a plurality of silencer panels positioned within the frame, each silencer panel including:

an acoustic absorbing material;

an enclosure surrounding the acoustic absorbing material, the enclosure including at least one plastic, perforated side wall; and a first electrostatic particle removing electrode extending parallel to at least one plastic, perforated side wall, the first electrostatic particle removing electrode configured to remove particles from a working fluid in conjunction with a second electrostatic particle removing electrode;

wherein the first electrostatic particle removing electrode is axially aligned with a flow direction of the working fluid.

* * * * *